Sept. 20, 1932.    A. W. SWARTZ    1,878,728
STOCKING TOPPING MACHINE
Filed Nov. 19, 1930    6 Sheets-Sheet 2
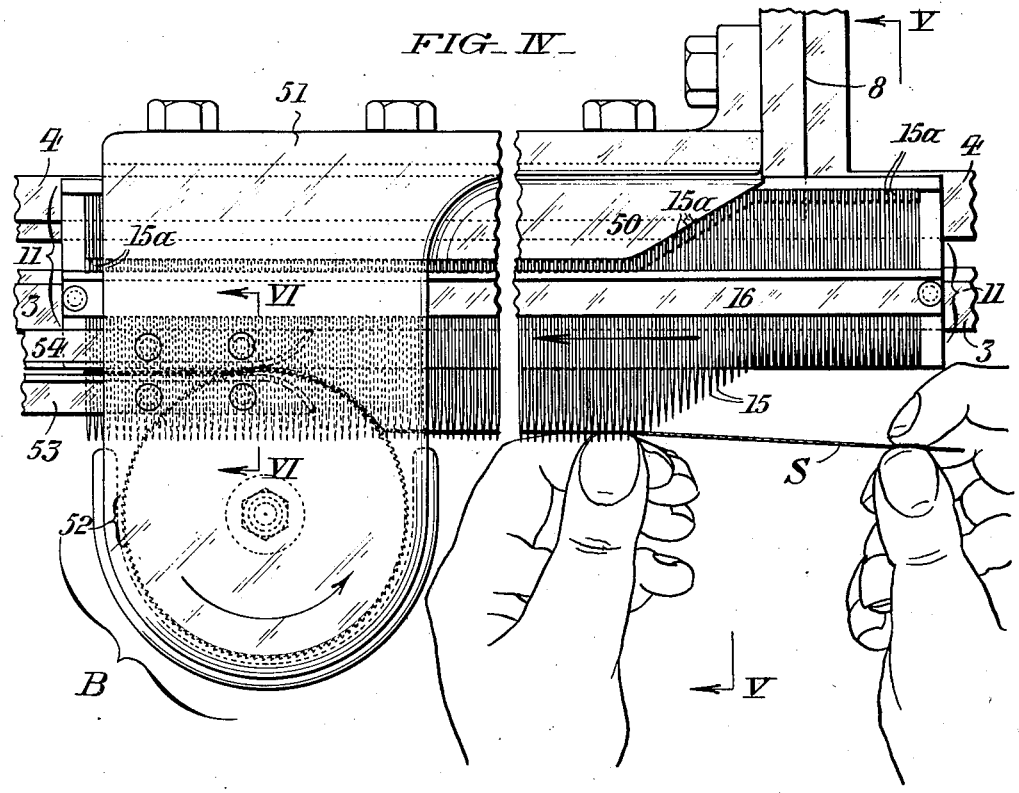
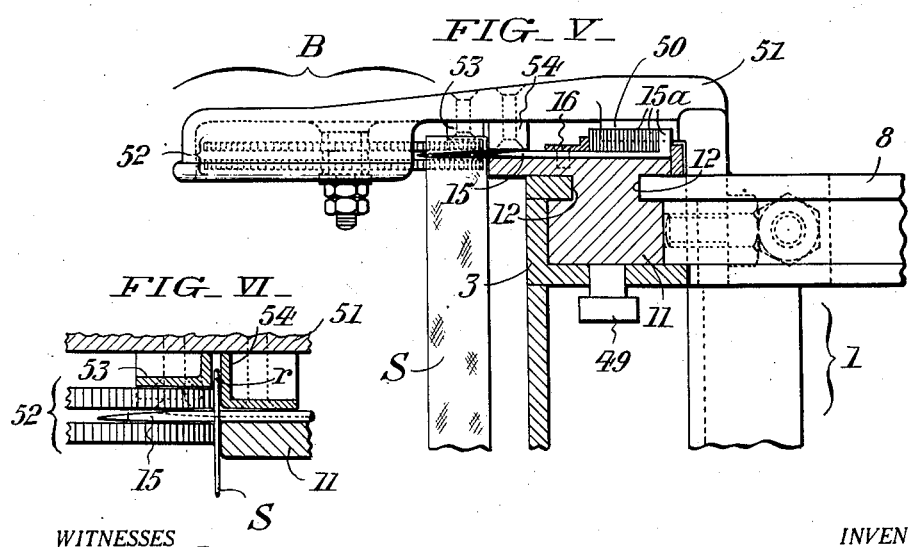
WITNESSES
INVENTOR:
Abraham Warren Swartz
BY
ATTORNEYS.

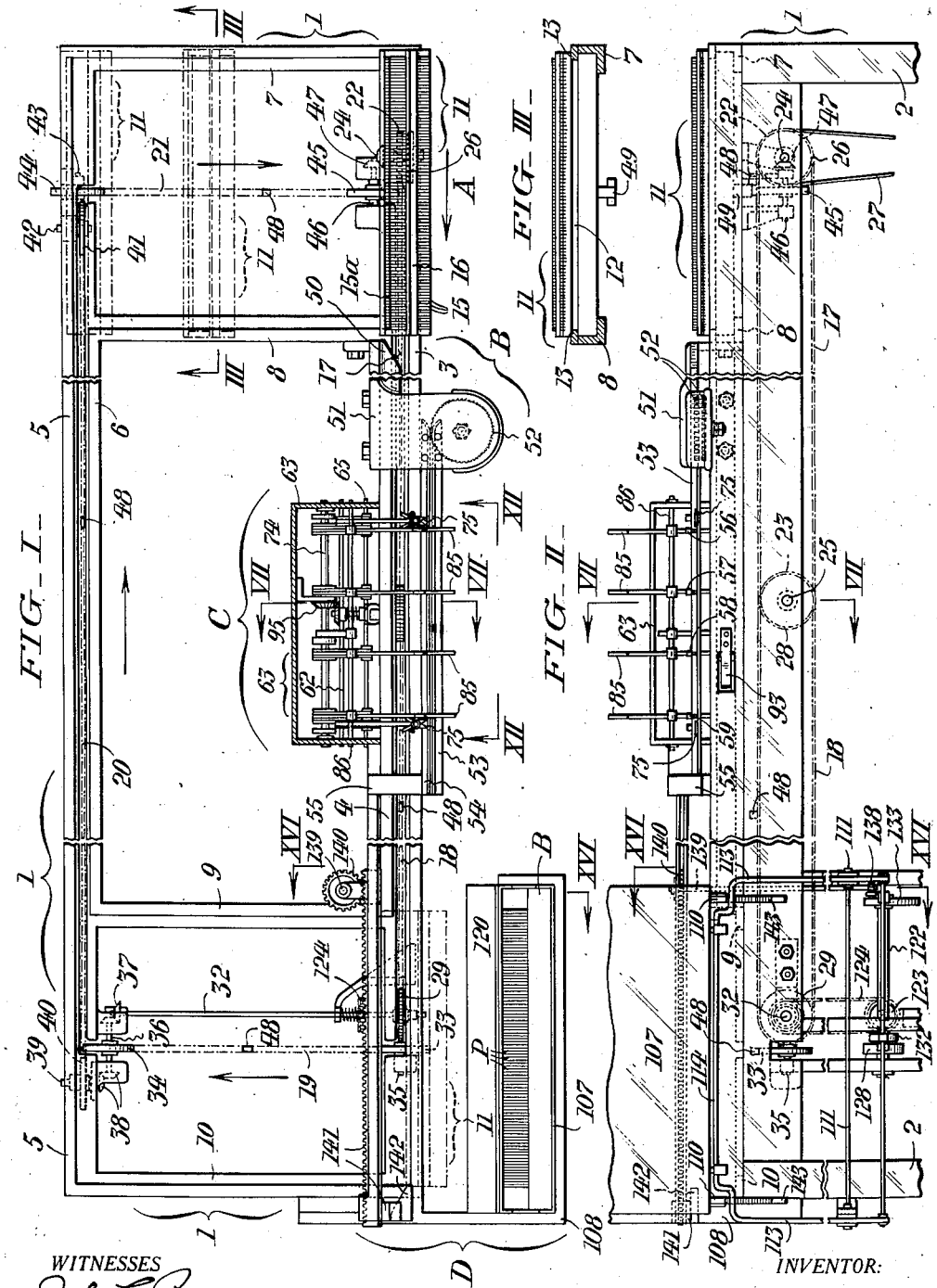

Sept. 20, 1932. A. W. SWARTZ 1,878,728
STOCKING TOPPING MACHINE
Filed Nov. 19, 1930 6 Sheets-Sheet 3
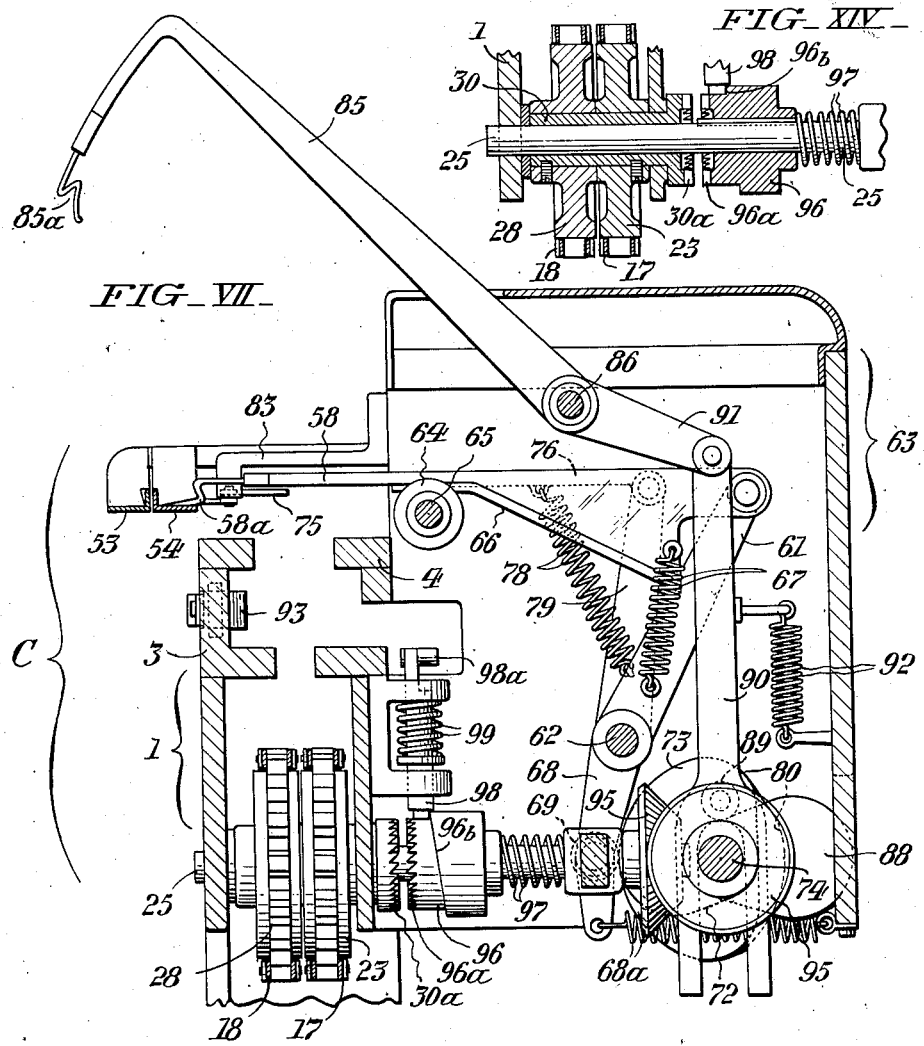
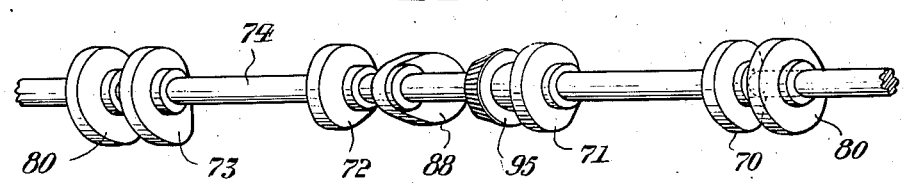
INVENTOR.
Abraham Warren Swartz

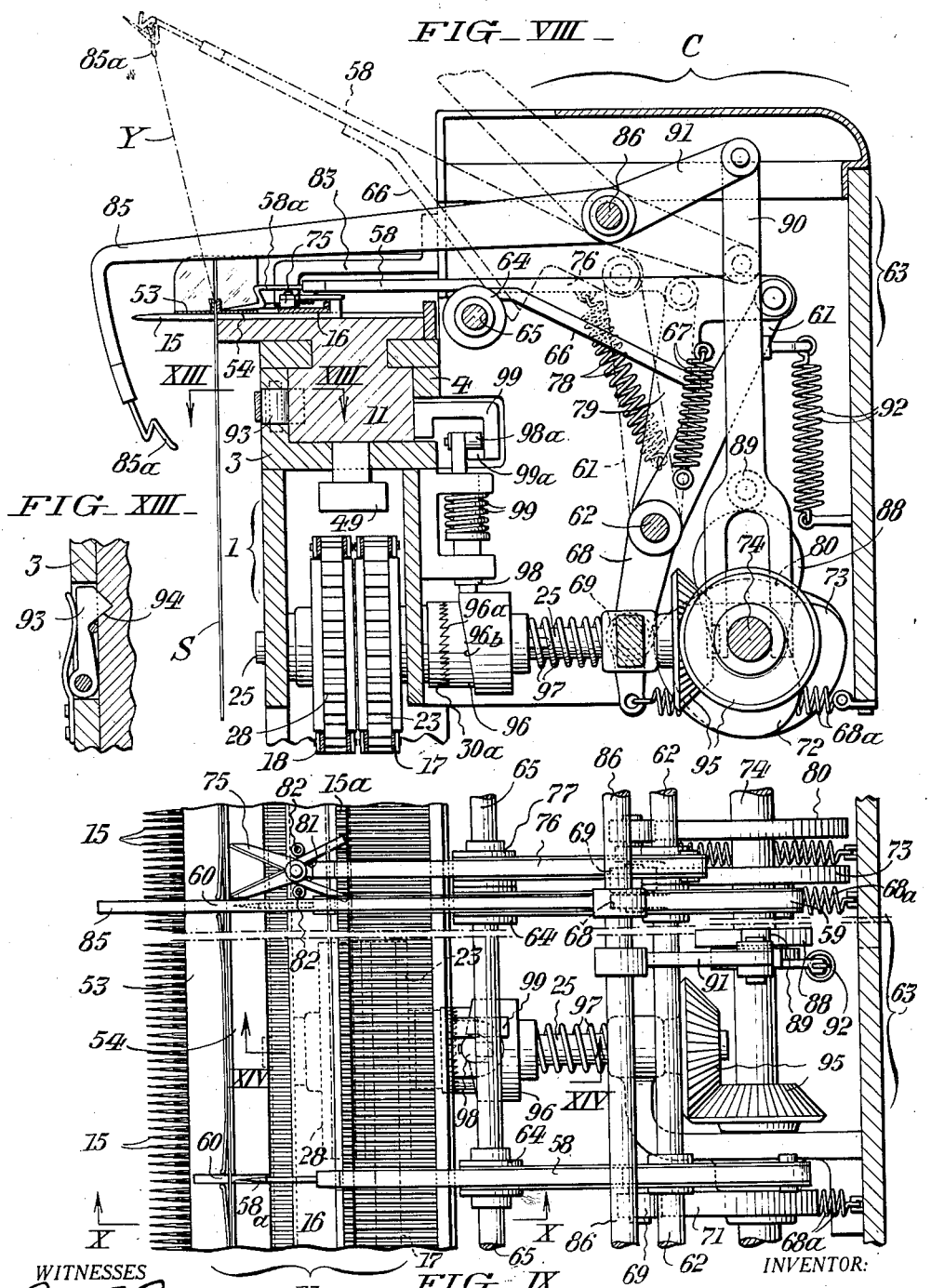

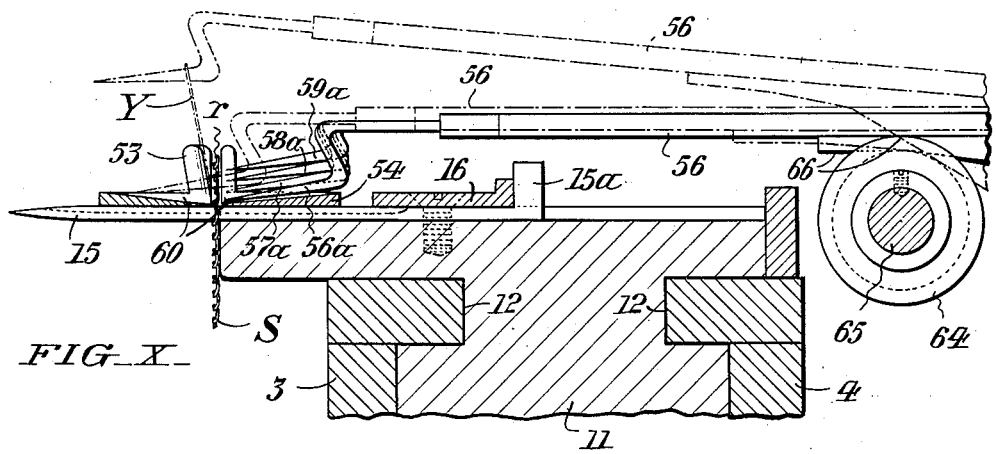
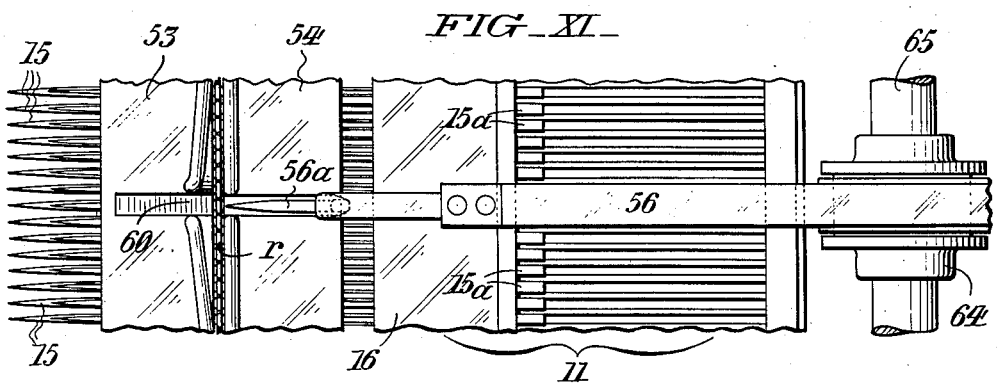
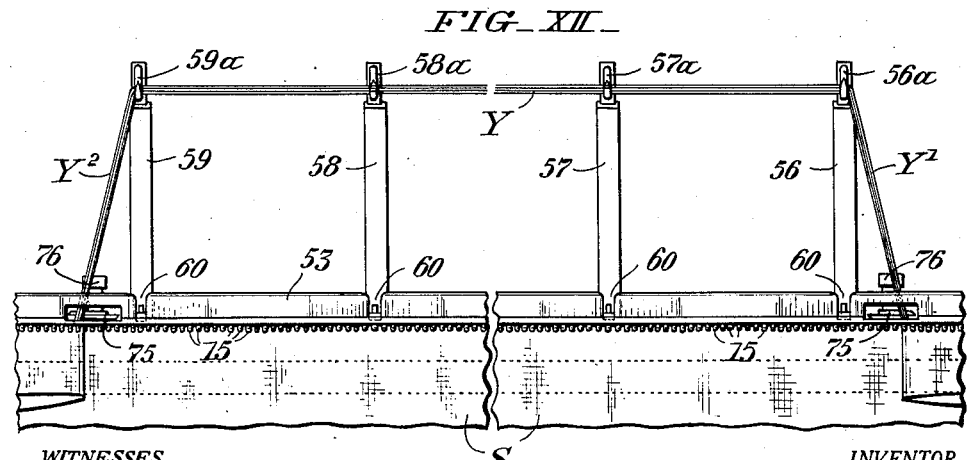

Sept. 20, 1932. A. W. SWARTZ 1,878,728
STOCKING TOPPING MACHINE
Filed Nov. 19, 1930 6 Sheets-Sheet 6
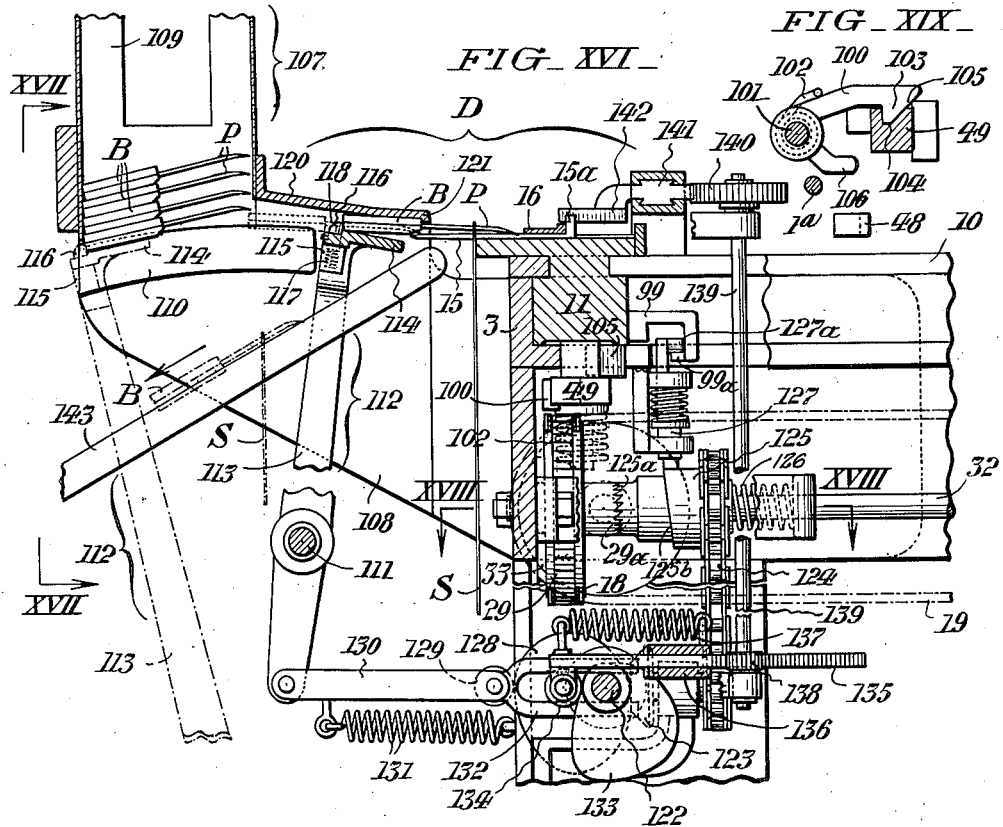
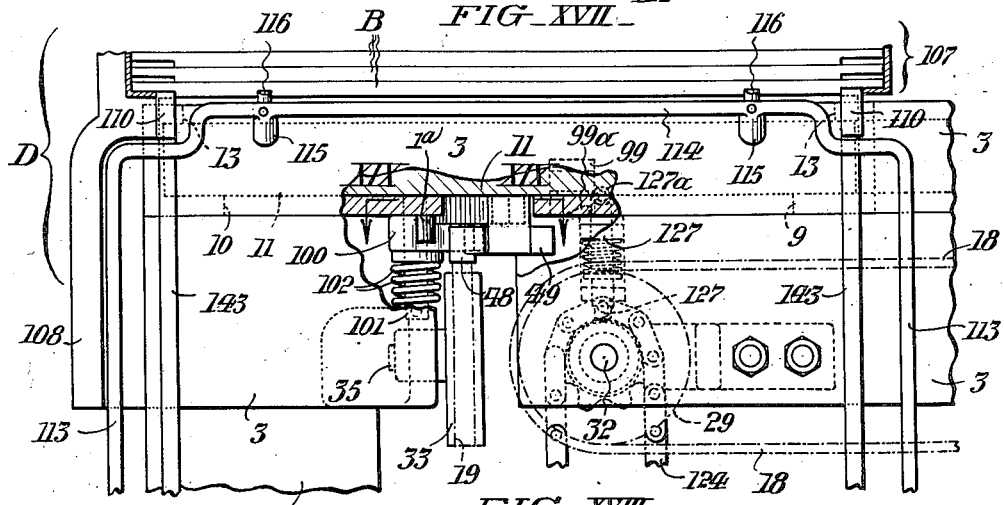
INVENTOR:
Abraham Warren Swartz Patented Sept. 20, 1932

1,878,728

UNITED STATES PATENT OFFICE

ABRAHAM WARREN SWARTZ, OF NORRISTOWN, PENNSYLVANIA, ASSIGNOR TO DEXDALE HOSIERY MILLS, OF LANSDALE, PENNSYLVANIA, A CORPORATION OF PENNSYLVANIA

STOCKING TOPPING MACHINE

Application filed November 19, 1930. Serial No. 496,643.

This invention relates to stocking topping machines, i. e., to machines useful in applying full-fashioned stocking blanks knit on "leggers" to transfer bars to enable placement of such stocking blanks upon the needles of footers for completion of the stocking feet.

The operation of applying stocking blanks to the transfer bars entirely by hand as, ordinarily done, is not only very tedious and slow but entails employment of skilled and expensive help, there being usually two toppers required for each twenty or twenty-four section footer, which adds very materially to production costs.

My invention is directed toward overcoming the recited drawbacks of previous practice in stocking topping through provision of a simple and reliable apparatus or machine capable of automatically removing the ravel courses from the stocking leg blanks, of automatically applying the leg blanks to the transfer bars, and of automatically delivering the bars with the mounted stockings in readiness for application to the footers.

In the accompanying drawings, Fig. I is a plan view of my improved stocking topping machine.

Fig. II is a front elevation of the machine.

Fig. III is a cross-section of the machine taken as indicated by the arrows III—III in Fig. I.

Fig. IV is a fragmentary plan view, drawn to a larger scale, showing the details of a "running-on" means forming a part of the machine.

Fig. V is a staggered fragmentary cross sectional view taken as indicated by the arrows V—V in Fig. IV.

Fig. VI is a detail sectional view taken as indicated by the arrows VI—VI in Fig. IV.

Fig. VII is a sectional view, taken as indicated by the arrows VII—VII in Figs. I and II, featuring the mechanism relied upon for removing the ravellings from the stocking blanks.

Fig. VIII is a view similar to Fig. VII with the parts of the ravel removing mechanism in different positions.

Fig. IX is a fragmentary plan view of the ravel removing mechanism with the parts positioned as in Fig. VIII.

Fig. X is a fragmentary detail sectional view of the ravel removing mechanism, taken as indicated by the arrows X—X in Fig. IX, and drawn to a larger scale.

Fig. XI is a plan view of the parts illustrated in Fig. X.

Fig. XII is a front elevation of the ravel removing mechanism, i. e. showing the mechanism when viewed as indicated by the arrows XII—XII in Fig. I.

Fig. XIII is a detail sectional view, taken as indicated by the arrows XIII—XIII in Fig. VIII, showing the latching means associated with the ravel removing mechanism.

Fig. XIV is a detail sectional view, taken as indicated by the arrows XIV—XIV in Fig. IX, showing a clutch means for controlling the actuation of the ravel removing mechanism.

Fig. XV is a perspective view of a cam shaft forming part of the ravel removing mechanism.

Fig. XVI is a staggered fragmentary sectional view, taken as indicated by the arrows XVI—XVI in Figs. I and II, showing the mechanism provided for transferring the stocking blanks to the welt bars.

Fig. XVII is a fragmentary front elevation of the mechanism of Fig. XVI, viewed as indicated by the arrows XVII—XVII in the latter figure.

Fig. XVIII is a fragmentary sectional view, taken as indicated by the arrows XVIII—XVIII in Fig. XVI, showing details of a clutch means controlling actuation of the transfer mechanism; and, Fig. XIX is a detail sectional view, taken as indicated by the arrows XIX—XIX in Fig. XVII, showing a latch means associated with the transfer mechanism.

As herein delineated, my improved automatic stocking topping machine comprises a horizontal frame 1 which is supported at table height from the floor by legs 2. As shown, the frame 1 is made up of closely spaced inner and outer longitudinal side rails 3, 4 and 5, 6 and more widely spaced inner and outer transverse end rails 7, 8 and 9, 10 which jointly constitute a closed rectangular trackway for a carriage comprehensively designated by the numeral 11. This carriage 11 has the form of an oblong block with lengthwise lateral grooves 12 to engage the longitudinal rails 3, 4 and 5, 6 of the frame 1 for guidance incident to progression along them. The carriage 11 is also provided at its ends with recesses 13, see Fig. III, for engaging flanges of the crosswise track rails 7, 8 and 9, 10 of the frame 1, and its upper face is transversely grooved to slidably guide a multiplicity of independent fluted points 15 whereto the leg blanks of the stockings are applied, as later on explained. As best shown in Figs. IV, V, X and XI, the points 15 are confined to their guide grooves by an overlying longitudinal retainer strip 16 and provided, at their rear ends, with upstanding actuating butts 15a.

The course of the carriage 11 around the track frame 1 is in accordance with the arrows in Fig. I, that is to say, it moves from right to left along the front of the frame 1 from a station A, then recedes along the left-hand end of said frame; then travels to the right along the back of the frame 1, and finally advances at the right-hand end of said frame to the station A in completing its circuit. Located at the front of the frame 1, immediately adjacent the station A, is a running-on means B which facilitates application of the stocking leg blanks to the points 15 of the carriage 11 by hand. Further along there is a mechanism C for removing the ravellings from the leg blanks; and at the opposite or left-hand end of the frame 1 there is a welt bar mechanism D whereby the transfer bars are presented to the carriage 11 and the stocking blanks transferred to said bars.

The means for progressing the carriage 11 as explained consists of a series of endless belts or sprocket chains, there being two such in series along the front of the frame 1 indicated at 17, 18, one extending crosswise of the left-hand end of the frame 1 designated 19; another along the back of the frame 1 designated 20; and a fourth crosswise of the right-hand end of the frame 1 designated 21. The chain 17 is trained about sprockets 22, 23 respectively on shafts 24, 25 of which the former constitutes the main drive shaft of the machine, it being accordingly fitted with a pulley 26 (Figs. I and II) for coordination, by a belt 27, with a suitable source of power, for example, an electric motor, not illustrated. As shown, the belt or chain 18 is trained about sprockets 28, 29, whereof the first 28 is secured with the sprocket wheel 23 of the chain 17 on a sleeve 30 (Fig. XIV) free on the shaft 25, while the second 29 is fast on a cross shaft 32 at the left-hand end of the machine, see Fig. XVIII. The sprockets 33, 34 for the cross chain 19 are secured respectively to shafts 35, 36, motion being communicated to the shaft 36 from the shaft 32 through a miter gear couple 37, and in turn from the shaft 36, through another miter gear couple 38, to a shaft 39 carrying the left-hand end sprocket wheel 40 of the rear chain 20. The other sprocket wheel 41 of the rear chain 20 is mounted on a shaft 42 adjacent another shaft 43 carrying the sprocket wheel 44 of the cross chain 21 at the right-hand end of the machine, the other sprocket 45 of the latter chain being secured on a shaft 46 which receives motion, through a bevel gear couple 47, from the main drive shaft 24 of the machine. All the sprocket chains 17—21 and their connections can be readily traced in Figs. I and II of the drawings; and each of said chains carries a projection 48 to engage a depending lug 49 on the carriage 11.

Referring now more particularly to Figs. IV, V and VI, it will be noted that the running-on mechanism B comprises a cam 50, which, by engaging the butts 15a of the points 15, projects said points outwardly of the carriage 11 so as to facilitate application of the stocking blank S to them by hand, as clearly shown in Fig. IV. The cam 50 is fixed on a bracket 51 bolted to the frame 1, said bracket being extended horizontally over the rail members 3 and 4 of the frame 1 to afford support for a freely revolving wheel 52. This wheel 52 is centrally recessed circumferentially as shown in Fig. VI to clear the points 15 on the passing carriage 11, and is formed with peripheral teeth to engage the fabric of the stocking blank S above and below the points 15 incident to pushing the impaled fabric loops further inward of said points, after the manner illustrated in Fig. IV. As a consequence of the described arrangement, the ravel portion $r$ (Fig. VI) of the leg blank fabric above the points 15 is directed into the interval between a pair of fixed parallel horizontal guide strips 53, 54 which are secured at one end to the bracket 51 and extend along the length of the ravel yarn removing mechanism C, see Figs. I and II. The opposite ends of the guide strips 53, 54 are supported by another bracket 55 which is also secured to the frame 1 and over-reaches the frame side rails 3, 4.

For disclosure of the details of the ravel yarn removing mechanism reference is had to Figs. VII–XV. As therein illustrated, this mechanism C embodies four fingers 56, 57, 58 and 59, which terminate in renewable hook points 56a, 57a, 58a and 59a, the several points occupying different levels, as shown in Fig. X, for capacity to penetrate different courses of the ravel portion $r$ of the stocking leg fabric. In order to permit the forward thrust of the points 56a—59a through the fabric $r$, the guides 53, 54 are cut away at corresponding points, as shown at 60 in Figs. X to XII, inclusive. The fingers 56—59 are pivotally connected individually at their inner ends to levers such as shown at 61 in Figs. VII and VIII, said levers being independently rockable on a longitudinal axis shaft 62 within the housing 63 of the mechanism C; while the fingers 56—59 rest on rollers 64 free to revolve on another horizontal axis rod 65 within the housing 63. Incident to forward projection, the fingers 56—59 are elevated, after the manner shown in dot-and-dash lines in Figs. VIII and X, through co-operation of cam inclines 66 on them with the rollers 64. Springs 67 in tension between the fingers 56—59 and the associated levers 61 serve to hold said fingers down on the rollers 64. From Figs. VII and VIII, it will be further noted that the levers 61 are provided respectively with depending extremities 68 having rollers 69 to engage rotary cams 70, 71, 72 and 73 (Fig. XII) on a horizontal shaft 74 afforded bearing support at its ends in the housing 63, said rollers 69 being held to the cams 70—73 by springs 68a effective upon the extremities 68. These cams 70—73 are so disposed angularly on the shaft 74 that the fingers 56—59 are successively actuated so that the first engages the uppermost courses of the ravel fabric r, the second and the third the intermediate courses, and the fourth the lowermost courses of the ravel fabric in a manner obvious from Fig. X. Incident to lifting of the ravel yarns Y clear of the points 15 on the carriage 11 by the fingers 56—59, as shown in Figs. VIII and XII, the upright end portions $Y^1$, $Y^2$, of the said yarns Y are brought into the province of cutting shears 75. As shown in Figs. VII and IX, these shears 75 are mounted on horizontal slides 76 which are supported upon rollers 77 free on the axis shaft 65 and held to said rollers by means of springs 78 in a manner similar to that described in connection with the fingers 56—59. The inner ends of the shear supporting slides 76 are pivoted to individual lever arms 79 which are rockable on the axis shaft 62, previously referred to, and fitted at their lower ends with rollers to engage rotary cams 80 mounted on the cam shaft 74, see Figs. VII-IX and XV. During rotation of the cam shaft 74, the slides 76 are advanced and the blades of the severing shears 75 closed, in opposition to springs 81 (Fig. IX) influencing them, to cut the yarns Y. Such operation of the shears 75 is brought about through engagement of their tails between the studs 82 secured in pairs to brackets 83 reaching outwardly from the housing 63. Immediately upon being severed as just explained, the yarns are removed from the fingers 56—59 by doffing arms 85 of which there are four in number corresponding to the said fingers. These doffing arms 85 are secured to a shaft 86 which is journalled within the housing 63, and at their outer ends are fitted with hook-like instrumentalities 85a, which, incident to downward movement of the arms, strip yarns Y from the fingers 56—59 as the latter concurrently retract and descend to their normal positions. After complete retraction of the fingers 56—59, the yarns Y simply drop out of the open hook ends 85a of the doffing arms 85, in a manner which will be obvious from Fig. VIII. The means relied upon for actuating the doffing arms 85 includes a rotary cam 88 on the shaft 74 (Figs. VII, VIII and XV) which acts upon a roller 89 on a vertical link 90, said link being connected at its upper end to a lever 91 secured to the shaft 86 carrying the doffing arms 85. As shown in Figs. VII and VIII, the lower end of the link 90 is bifurcated for guidance by the cam shaft 74, and, moreover, subject to a tension spring 92 which maintains the roller 89 in contact with the cam 88. The operations of ravelling the looper's courses from the fabric S and doffing the severed yarns Y take place during a single rotation of the cam shaft 74 and while the carriage 11 temporarily dwells on the rails 3 and 4, at the mechanism C, after having been brought into position by the projection 48 on the progressing sprocket chain 17 and released as a consequence of the passage of the projection around the sprocket wheel 23. During the dwell, the carriage 11 is held from displacement by a spring urged detent 93 (Figs. VIII and XIII) pivoted within an opening in the rail 3 of the frame 1 and which has its beveled end yieldingly engaging a recess 94 in the side of the carriage 11. The cam shaft 74, which is normally quiescent with the several parts of the mechanism C in the positions shown in Fig. VII, derives movement, through a bevel gear couple 95 from the free sleeve 30 (Fig. XIV) on the shaft 25 that carries the two sprocket wheels 23, 28. Actuation of the shaft 74 is controlled by a clutch collar 96 splined on the shaft 25 with capacity for axial shifting, and formed at one end with teeth 96a to mesh with teeth 30a at the contiguous end of the sleeve 30, see Figs. VII, VIII and XIV. A spring 97 surrounding the shaft 25 tends to urge the clutch collar 96 toward the sleeve 30, it being normally held away from the latter, see Figs. VII and XIV by a latch bolt 98. This bolt 98 is vertically slidable in bearing lugs that project laterally from the inner frontal rail 4 of the frame 1. As shown, the latch bolt 98 is urged downward by means of a spring 99 so that its lower end normally engages a circumferential cam edge 96b of the clutch collar 96 to hold the latter retracted. As the carriage 11 is advanced along the rails 3, 4 of the frame 1 into position before the mechanism C, a cam shoe 99a supported by a laterally projecting bracket 99 on said carriage engages beneath a lug 98a at the top of the latch bolt 98, thereby lifting the latter and causing release of the clutch collar 96 to the action of its spring 97. After the cutting and doffing of the ravel yarns Y has been accomplished and before the cam shaft 74 has completed one revolution, the carriage 11 is engaged by the projection 48 on the second sprocket chain 18, so that the latch bolt 98 is freed and descends into the path of the circumferential cam edge 96b on the clutch collar 96, the latter being thereby retracted. The cam shaft 74 is thus confined to a single revolution for each actuation of the yarn ravelling and doffing mechanism C, and operated only when the carriage 11 is presented to said mechanism.

With the ravel yarns Y now removed from the stocking blank S suspended from the points 15 of the carriage 11, said carriage is further advanced along the rails 3, 4 at the front of the frame 1 through engagement of its downward lug 49 with the projection 48 of the chain 18, and finally comes to rest at the melt-bar mechanism D. Here the carriage 11 is locked against accidental retrogression on the frame rails 3, 4 as well as against rearward movement on the transverse frame rails 9, 10 by a latch member in the form of a dog, shown at 100 in Figs. XVI, XVII and XIX. This dog 100 is pivoted for horizontal movement about a fulcrum stud 101 depending from the frame rail 3, and is subject to a coiled spring 102 which tends to urge its locking projection 103 into a recess 104 in the downward lug 49 of the carriage 11. By virtue of a cam bevel at 105, the dog 100 is swung back out of the way by the depending lug 49 of the carriage 11 incident to advance of said carriage into position at the welt-bar mechanism D. Movement of the dog 100 under the influence of the spring 102 is limited through engagement of a tail 106 thereof with a suitably-located stop 1a on the frame 1, as conventionally indicated in Fig. XIX. As shown in Figs. I, II, XVI and XVII, the mechanism D comprises a vertical magazine 107 for empty transfer bars B, said magazine being supported from the frame 1 by means of angle brackets 108 of the machine. From Fig. XVI it will be noted that the magazine 107 is open at the ends as at 109 to facilitate introduction, from above, of transfer bars B which are of the type ordinarily employed in connection with full-fashioned stocking manufacture and provided with the usual laterally projecting points P. Within the magazine 107 the lowermost transfer bar B of the stack is supported at the ends by inward guides 110 afforded by the brackets 108. The guides 110, it will be noted, are curved concentrically with respect to a shaft 111 journalled at the lower part of the frame 1; and on this shaft 111 is mounted an ejector having the form of a yoke 112 with side arms 113 and a connecting top cross bar 114. Axially slidable in sockets 115 on the cross bar of the yoke 112 are pins 116, which are yieldingly urged upward by springs 117 (Fig. XVI) and beveled at the rear as at 118 in said figure. Accordingly, as the ejector 112 is swung outward, the pins 116 are depressed as they encounter the lowermost transfer bar B in the magazine 107, but finally engage the rear edge of said bar, as shown in dot-and-dash line position in Fig. XVI. When the ejector yoke 112 is subsequently moved inward, to the full line position of Fig. XVI, it carries the lowermost transfer bar B with it, said bar being guided by the arcuate projections 110 of the brackets 108 beneath a guard 120 attached to the magazine. This guard 120 serves to prevent lifting of the transfer bar B and at the same time causes depression of the points P of said bar into the flutes or grooves of the points 15 on the carriage 11, so that the fabric loops on the points 15 are penetrated by the transfer bar points P. The inward movement of the transfer bar B under the action of the ejector 112, is limited by a depending flange 121 of the guard 120, also as shown in Fig. XVI. The means for actuating the welt bar mechanism D includes a cam shaft 122 which is disposed horizontally beneath the track rail 3 of the frame 1 and journalled for rotation in suitable bearings afforded by said frame. The cam shaft 122 is driven by means of bevel gearing 123 and a coordinating sprocket chain 124 from a clutch collar 125 mounted free on the shaft 32 hereinbefore described, but capable of being axially shifted for the purpose of engaging teeth 125a at one end thereof with teeth 29a on the hub of the sprocket wheel 29 of the progressing chain 18. The clutch collar 125 is subject to a spring 126 (Fig. XVIII) tending to move it into active position, but is normally held retracted through engagement of a spring pressed bolt 127 which is slidable in fixed lugs of the machine frame 1, with a circumferential cam shoulder 125b on the collar 125. At its upper end the bolt 127 is provided with a lug 127a for operation by the cam 99a on the bracket projection 99 of the carriage 11 just before said carriage reaches its rest position at the mechanism D under progression of the chain 18. Thus, as was the case with the cam shaft 74 of the ravel removing mechanism C, the cam shaft 122 of the welt bar mechanism D is confined to a single rotation for each actuation of said mechanism D in the presence of the carriage 11. As shown in Fig. XVI, the cam shaft 122 carries a rotary cam 128, which, through cooperation with a roller 129 on a link 130 connecting with the ejector 112, causes the latter to be swung in the manner previously explained in opposition to a spring 131, the said link being bifurcated, as at 132, for guidance by the cam shaft 122. The cam shaft 122 also carries a rotary cam 133 which is operative upon a roller 134 at one end of a toothed rack 135 which is guided for longitudinal sliding movement in a fixed bearing 136 on the frame 1 and is subject to the influence of a tension spring 137. The rack 135 imparts movement to a pinion 138 fast on a vertical shaft 139, journalled in suitable bearings afforded by the frame 1. At its upper end the vertical shaft 139 is fitted with a toothed wheel 140 to engage rack teeth on a slide 141 guided for horizontal movement longitudinally of the top of the frame 1. This slide 141 has attached to it a cam 142 for engaging the forward edges of the butts 15a of the points 15 on the carriage 11 while the latter is stationary, thereby to retract said points so that the suspended stocking blank S is left on the points P of the transfer bar B previously brought into position in a manner already explained. Such retraction of the points 15 occurs immediately after the transfer bar B has been brought forward from the magazine 107 by the ejector 112, the slide 141 carrying the cam 142 making a complete reciprocation before the shaft 122 comes to rest. As the ejector 112 is moved outward at the next actuation of the welt bar mechanism D, the transfer bar B to which the fabric S has been applied as just explained, is released, and drops onto inclined slides 143 beneath the magazine 107 for discharge automatically from the apparatus, as indicated in dot-and-dash lines in Fig. XVI.

With the points 15 now withdrawn, the carriage 11 is moved rearward on the transverse rails 9, 10 of the frame 1 by the chain 19, after advance withdrawal of the dog 100, through engagement of the tail 106 on the latter by the projection 48 on the progressing chain 19, in a manner which will be apparent from Fig. XIX. After having been moved to the rear track rails 5, 6 of the frame, the carriage 11 is advanced along the rack of the machine by the chain 20 to the right, and thence forward of the right-hand end of the machine by the chain 21, to the position A in readiness for application of a new stocking blank S to its points 15.

Having thus described my invention, I claim:

1. In an automatic stocking topping machine, means with points to receive a stocking leg blank; and rotary means for pushing the fabric loops of the stocking blank progressively back incident to impalement on the points.

2. In an automatic stocking topping machine, means with independent points to receive a stocking leg blank; and means for progressively projecting the points to facilitate application of the stocking blank to them.

3. In an automatic stocking topping machine, means with independent points to receive a stocking leg blank; means for progressively advancing the points to facilitate application of the stocking blank to them; and means for concurrently pushing the impaled fabric loops of the stocking leg blank uniformly back on the points.

4. In an automatic stocking topping machine, a travelling carriage with a series of independent points to receive a stocking leg blank; a guideway for the carriage; and cam means along said guideway for progressively advancing the points incident to travel of the carriage, thereby to facilitate application of the stocking blank to the points.

5. In an automatic stocking topping machine, a travelling carriage with a series of independent points to receive a stocking leg blank; a guideway for the carriage; means for progressively advancing the points incident to travel of the carriage along the guideway to facilitate application of the stocking blank to the points; and means for concurrently pushing the fabric loops of the stocking blank uniformly back on the points of the carriage.

6. In an automatic stocking topping machine, a travelling carriage with a series of independent points to receive a stocking leg blank; a guideway for the carriage; means along the guideway for progressively advancing the points incident to travel of the carriage to facilitate application of a stocking blank to the points; and a circumferentially recessed toothed wheel for engaging the stocking blank above and below said points to push the impaled loops of the fabric uniformly back on the points.

7. In an automatic stocking topping machine, means with points to receive a stocking leg blank; means to hold the stocking leg blank against displacement on the points; and mechanism for removing the looper's ravel courses while the stocking blank is so held on the points.

8. In an automatic stocking topping machine, a travelling carriage with points to receive a stocking leg blank; a guideway for the carriage; means along the guideway for pushing the stocking fabric uniformly back on the points incident to travel of the carriage; guide means for receiving and confining the ravel portion of the fabric upstanding from the points after being pushed back as aforesaid incident to further progression in the machine; and mechanism for removing the ravel yarns during a temporary dwell of the carriage and while the ravel fabric is constrained in the guide means.

9. In an automatic stocking topping machine, means with points to receive a stocking leg blank; means for holding the stocking blank against displacement on the points; and mechanism operative while the stocking fabric is so held to remove the looper's ravel courses, the said mechanism including a number of fingers for engaging the looper's courses one after another in drawing the ravel yarns away from the stocking.

10. In an automatic stocking topping machine, means with horizontal points to receive a stocking leg blank; means for preventing displacement of the stocking blank while suspended from the points; and mechanism for removing the looper's ravel courses including a number of fingers, actuating means for successively thrusting the fingers through the ravel fabric at different levels above the points to pull off the ravel yarns.

11. In an automatic stocking topping machine, means with horizontal points to receive a stocking leg blank; means for preventing displacement of the stocking blank while suspended from the points; and mechanism for removing the looper's ravel courses including a number of fingers, actuating means for successively thrusting the fingers through the ravel fabric at different levels above the points to pull off the ravel yarns, and means also operated by the said actuating mechanism for severing the ravel yarns and for removing them from the fingers.

12. In an automatic stocking topping machine, progressive point means to receive a stocking leg blank; mechanism to present a transfer bar to the point means incident to temporary stoppage of the latter; and means for subsequent retracting the point means for retainment of the stocking blank by the transfer bar.

13. In an automatic stocking topping machine, a carriage with independent points for receiving a stocking leg blank; a guideway for the carriage; means along the guideway for progressively advancing the points on the carriage to facilitate application to them of the stocking leg blank; and mechanism further along the guideway for presenting a transfer bar to the carriage and for subsequently retracting the points on the carriage for retainment of the stocking blank by the transfer bar.

14. In an automatic stocking topping machine, a carriage with independent points to receive a stocking leg blank; a guideway for the carriage; means along the guideway for progressively advancing the points on the carriage to facilitate application thereto of the stocking blank; and means further along said guideway for presenting a transfer bar incident to a temporary dwell of the carriage, the said mechanism including a magazine to accommodate a number of transfer bars one above another, means for engaging the lowermost welt bar of the stack incident to each operation and ejecting such transfer bar from the magazine to register its points with those of the carriage, and means for subsequently retracting the points on the carriage for retainment of the stocking blank by the transfer bar.

15. In an automatic stocking topping machine, point means to receive a stocking leg blank; mechanism for removing the looper's ravel courses from the stocking leg blank while on the said point means; and means for subsequently presenting a transfer bar to the point means to receive the stocking blank from the latter.

16. In an automatic stocking topping machine, a traveling carriage with points to receive a stocking leg blank; a guideway for the carriage; means along the guideway for removing the looper's ravel courses from the stocking leg blank while on the points of the carriage; and means further along the guideway for presenting a transfer bar to the carriage to receive the stocking leg blank from the points of the carriage.

17. In an automatic stocking topping machine, a travelling carriage with points to receive a stocking leg blank; a closed guideway for the carriage; means at one point along the guideway for removing the ravel courses from the stocking blank; means further along the guideway for presenting a transfer bar to the carriage to receive the stocking blank from the points of the latter; and means for progressing the carriage around the closed guideway for repetitions of the described cycle.

18. In an automatic stocking topping machine, a travelling carriage with points to receive a stocking leg blank; a closed guideway of oblong configuration for the carriage; mechanism along the front of the said guideway for removing the looper's ravel courses from the stocking blanks while on the points of the carriage; and mechanism further along the front of the guideway for presenting a transfer bar to the carriage to receive the stocking leg blank from the points of the latter; and means for progressing the carriage around the four sides of the blank guideway to the point of beginning for repetition of the described cycle.

19. In an automatic stocking topping machine, a carriage with points to receive a stocking leg blank; a guideway for the carriage; means along the guideway for removing the ravel courses from the stocking blank while on the points of the carriage incident to a temporary dwell of the latter, the said mechanism being dependent for its actuation upon the presence of the carriage; and means further along the guideway for presenting a transfer bar to the carriage incident to another dwell of the latter to receive the stocking leg blank from the points of the carriage, the last mentioned mechanism being likewise dependent for its actuation upon the presence of the carriage.

20. In an automatic stocking topping machine, a travelling carriage with points to receive a stocking leg blank; a guideway for the carriage; means along the guideway for progressively advancing the points on the carriage to facilitate application of the leg blank; means further along the guideway for removing the looper's ravel courses from the stocking leg blank while on the points of the carriage; and means still further along the guideway for presenting a transfer bar to the carriage to receive the stocking leg blank from the points of the carriage.

In testimony whereof, I have hereunto signed my name at Lansdale, Pennsylvania, this 14th day of November, 1930.

ABRAHAM WARREN SWARTZ.